(No Model.)
A. G. PATTON.
TEA KETTLE.
No. 463,166.          Patented Nov. 17, 1891.
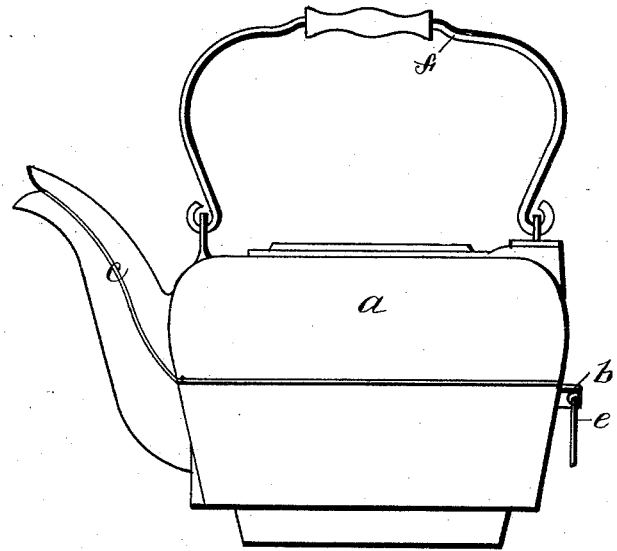
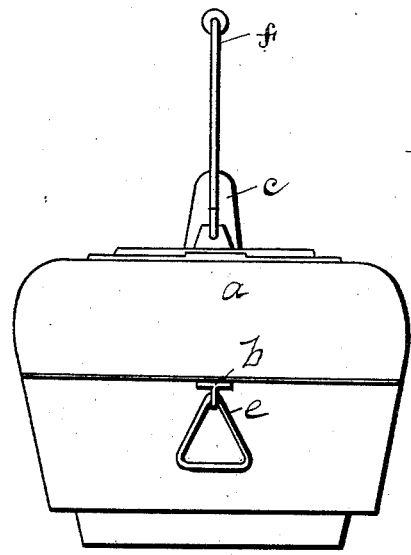
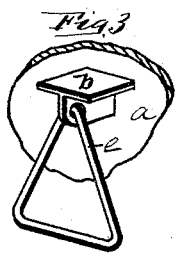
WITNESSES:
J. H. Fravel.
W. S. Shepherd
INVENTOR
Alexander G. Patton
BY
Staley and Shepherd
ATTORNEYS

UNITED STATES PATENT OFFICE.

ALEXANDER G. PATTON, OF COLUMBUS, OHIO.

TEA-KETTLE.

SPECIFICATION forming part of Letters Patent No. 463,166, dated November 17, 1891.

Application filed May 12, 1890. Serial No. 351,429. (No model.)

*To all whom it may concern:*

Be it known that I, ALEXANDER G. PATTON, a citizen of the United States, residing at Columbus, in the county of Franklin and State of Ohio, have invented a certain new and useful Improvement in Tea-Kettles, of which the following is a specification.

My invention relates to tea-kettles; and the object of my invention is to provide a tea-kettle with a side bale or pendent handle which will afford a hand-hold in tipping the kettle to pour liquid therefrom. This object I accomplish in the manner illustrated in the accompanying drawings, in which—

Figure 1 is a side elevation of a tea-kettle having the bail attached thereto. Fig. 2 is a rear view of the same; and Fig. 3 is a detail view in perspective of the form of bail which I preferably employ and the manner of attachment to the kettle.

Similar letters refer to similar parts throughout the several views.

In order to accomplish the object of my invention I preferably provide the kettle-body $a$ with an outwardly-projecting lug $b$ on its rear side, or that side opposite that on which is located the spout $c$. From this lug is made to depend a wire or other side bail $e$.

Heretofore the tipping of a kettle has been accomplished solely by grasping and pressing forward the top bail or handle $f$. This operation is difficult, and, as is well known, not only requires strength of wrist and an exceedingly firm grasp, but fails to overcome the tendency of the tea-kettle to swing sidewise.

In using the kettle having my improved bail thereon, the top bail or ordinary handle $f$ is grasped in one hand and the small rear bail $e$ is supported by the fingers of the remaining hand. In thus supporting the small bail the lug $b$ may operate as a stop or limit to its upward movement. The movements of the kettle are thus easily controlled and the work divided between the two hands.

It will be observed that the attachment of a small rear finger-bail to a tea-kettle may be made in a neat and simple form without marring the appearance of the kettle.

Having now fully described my invention, what I claim, and desire to secure by Letters Patent, is—

The combination, in a tea-kettle, of a T-shaped lug projecting from the side thereof and a triangular bail journaled at one of its angles in the vertical stem of said lug, substantially as and for the purpose described.

ALEXANDER G. PATTON.

In presence of—
C. C. SHEPHERD,
J. H. FRAVEL.